(12) United States Patent
Thurling

(10) Patent No.: US 10,339,630 B2
(45) Date of Patent: Jul. 2, 2019

(54) SYSTEMS AND METHODS FOR FACILITATING ENHANCED DISPLAY CHARACTERISTICS BASED ON VIEWER STATE

(71) Applicant: DISH Technologies L.L.C., Englewood, CO (US)

(72) Inventor: Andrew Thurling, Keighly (GB)

(73) Assignee: DISH Technologies L.L.C., Englewood, CO (US)

( * ) Notice: Subject to any disclaimer, the term of this patent is extended or adjusted under 35 U.S.C. 154(b) by 0 days.

(21) Appl. No.: 15/878,069

(22) Filed: Jan. 23, 2018

(65) Prior Publication Data
US 2018/0165794 A1    Jun. 14, 2018

Related U.S. Application Data

(63) Continuation of application No. 15/591,260, filed on May 10, 2017, now Pat. No. 9,916,639, which is a
(Continued)

(51) Int. Cl.
*G06T 3/40* (2006.01)
*G09G 3/20* (2006.01)
(Continued)

(52) U.S. Cl.
CPC .............. *G06T 3/40* (2013.01); *G09C 1/00* (2013.01); *G09G 3/2092* (2013.01);
(Continued)

(58) Field of Classification Search
CPC .......... G06T 3/40; G09C 1/00; G09G 3/2092; G09G 2340/04; G09G 2354/00;
(Continued)

(56) References Cited

U.S. PATENT DOCUMENTS 8,525,930 B2    9/2013  Hsieh
8,619,095 B2 *  12/2013  Jaramillo ................. G09G 5/00
                                                          345/619

(Continued)

FOREIGN PATENT DOCUMENTS

EP          2 073 192 A1    6/2009

OTHER PUBLICATIONS

International Search Report and Written Opinion for PCT/GB2015/051902 dated Sep. 21, 2015, all pages.

(Continued)

*Primary Examiner* — Abderrahim Merouan
(74) *Attorney, Agent, or Firm* — Kilpatrick Townsend & Stockton LLP

(57) ABSTRACT

Systems and methods for facilitating enhanced display characteristics based on viewer state are provided. A media device may process an indication of a first state of a first viewer of a display device that is coupled to the media device. The indication of the first state of the first viewer may be captured at a time corresponding to the display device displaying first content with a first set of one or more size characteristics. The media device may determine a display adjustment based at least in part on the indication of the first state of the first viewer. The media device may cause the display device to display second content in accordance with the display adjustment so that the display device displays at least a portion of the second content with a second set of one or more size characteristics that is different from the first set of one or more size characteristics.

20 Claims, 8 Drawing Sheets

Related U.S. Application Data continuation of application No. 14/321,613, filed on Jul. 1, 2014, now Pat. No. 9,684,948.

(51) Int. Cl.
*H04N 21/4223* (2011.01)
*H04N 21/431* (2011.01)
*H04N 21/442* (2011.01)
*H04N 21/45* (2011.01)
*G09C 1/00* (2006.01)

(52) U.S. Cl.
CPC ..... *H04N 21/4223* (2013.01); *H04N 21/4312* (2013.01); *H04N 21/44218* (2013.01); *H04N 21/4532* (2013.01); *G09G 2340/04* (2013.01); *G09G 2354/00* (2013.01)

(58) Field of Classification Search
CPC ........... H04N 21/4223; H04N 21/4312; H04N 21/44218; H04N 21/4532
See application file for complete search history.

(56) References Cited

U.S. PATENT DOCUMENTS

| | | | |
|---|---|---|---|
| 8,659,703 B1 | 2/2014 | Candelore | |
| 9,684,948 B2 | 6/2017 | Thurling | |
| 9,716,599 B1* | 7/2017 | Gates | ............. H04L 12/58 |
| 9,916,639 B2 | 3/2018 | Thurling | |
| 2003/0093600 A1* | 5/2003 | Perala | ............. G06F 1/1626 710/72 |
| 2003/0234799 A1* | 12/2003 | Lee | ............. G06F 3/1407 345/660 |
| 2004/0230904 A1 | 11/2004 | Tada | |
| 2005/0229200 A1 | 10/2005 | Kirkland et al. | |
| 2009/0079765 A1 | 3/2009 | Hoover | |
| 2009/0164896 A1 | 6/2009 | Thorn | |
| 2010/0103197 A1* | 4/2010 | Liu | ............. G09G 5/222 345/660 |
| 2010/0251171 A1 | 9/2010 | Parulski | |
| 2011/0254846 A1* | 10/2011 | Lee | ............. G06F 3/011 345/427 |
| 2012/0060177 A1 | 3/2012 | Stinson et al. | |
| 2012/0072939 A1* | 3/2012 | Crenshaw | ............. H04H 60/33 725/12 |
| 2012/0246678 A1* | 9/2012 | Barksdale | ............. G06F 3/011 725/37 |
| 2013/0027614 A1 | 1/2013 | Bayer et al. | |
| 2013/0057553 A1 | 3/2013 | Chakravarthula et al. | |
| 2014/0184796 A1* | 7/2014 | Klein | ............. H04N 21/41422 348/148 |
| 2015/0121428 A1 | 4/2015 | Nguyen et al. | |
| 2015/0194134 A1 | 7/2015 | Dureau et al. | |

OTHER PUBLICATIONS

International Preliminary Report on Patentability for PCT/GB2015/051902 dated Jan. 3, 2017, all pages.

U.S. Appl. No. 15/591,260, filed May 10, 2017, Non-Final Rejection dated Jul. 28, 2017, all pages.

U.S. Appl. No. 15/591,260, filed May 10, 2017, Notice of Allowance dated Nov. 16, 2017, all pages.

U.S. Appl. No. 14/321,613, filed Jul. 1, 2014, Preinterview first office action dated Mar. 4, 2016, all pages.

U.S. Appl. No. 14/321,613, filed Jul. 1, 2014, Final Rejection dated Jul. 15, 2016, all pages.

U.S. Appl. No. 14/321,613, filed Jul. 1, 2014, Non-Final Rejection dated Sep. 22, 2016, all pages.

U.S. Appl. No. 14/321,613, filed Jul. 1, 2014, Notice of Allowance dated Feb. 10, 2017, all pages.

* cited by examiner 502 504

| | 11:00 PM | 12:00 AM | 1:00 AM | 2:00 AM | 3:00 AM | 4:00 AM | 5:00 AM | 6:00 AM | 7:00 AM | 8:00 AM |
|---|---|---|---|---|---|---|---|---|---|---|
| 005 | Red Morning | | | | News | Stock Watch | | Good Morning Sunshine | | |
| 005-HD | Red Morning | | | | News | Stock Watch | | Good Morning Sunshine | | |
| 006 | News | WW2 Dog Fights | | | | | | | | News |
| 006-HD | News | WW2 Dog Fights | | | | | | | | News |
| 007 | The Life of Winston Churchill | | | Paid Programming | | | | | | News |
| 007-HD | The Life of Winston Churchill | | | Paid Programming | | | | | | News |
| 008 | News | Bach is Back | | Symphony Afficianado | | | | Masterpiece Murder Mystery | | |
| 008-HD | News | Bach is Back | | Symphony Afficianado | | | | Masterpiece Murder Mystery | | |
| 009 | Singing Competition XVI | | | Dancing Till You Drop | | | | Cricket Classics | | |
| 010 | Not Your Average Suburb | | | Ghost Hunter | | Toughest Jobs on Earth | | | | |
| 010-HD | Not Your Average Suburb | | | Ghost Hunter | | Toughest Jobs on Earth | | | | |
| 011 | Sportsworld | | Sportsworld | | Baseball | Fantasy Football | | 2010 Championship Game | | |
| 011-HD | Sportsworld | | Sportsworld | | Baseball | Fantasy Football | | 2010 Championship Game | | |
| 012 | BBB World News | | | | Financial News Center | | | Market Watch | | |
| 013 | The Life of Jeeves | | Spaghetti Western Marathon | | | | | | | |
| 013-HD | The Life of Jeeves | | Spaghetti Western Marathon | | | | | | | |

| | 11:00 PM | 12:00 AM | 1:00 AM | 2:00 AM | 3:00 AM |
|---|---|---|---|---|---|
| 007 | The Life of Winston Churchill | | | Paid Programming | |
| 007-HD | The Life of Winston Churchill | | | Paid Programming | |
| 008 | News | Bach is Back | | Symphony Afficianado | |
| 008-HD | News | Bach is Back | | Symphony Afficianado | |
| 009 | Singing Competition XVI | | | Dancing Till You Drop | |
| 010 | Not Your Average Suburb | | | Ghost Hunter | |
| 010-HD | Not Your Average Suburb | | | Ghost Hunter | |
| 011 | Sportsworld | | Sportsworld | | Baseball |

SYSTEMS AND METHODS FOR FACILITATING ENHANCED DISPLAY CHARACTERISTICS BASED ON VIEWER STATE

CROSS-REFERENCES TO RELATED APPLICATION

This application is a continuation of U.S. application Ser. No. 15/591,260, filed May 10, 2017, which is a continuation of U.S. application Ser. No. 14/321,613, filed Jul. 1, 2014, the disclosures of which are incorporated by reference herein in their entireties.

The present disclosure relates in general to television devices, and, more specifically, but not by way of limitation, to systems and methods for facilitating enhanced display characteristics based on viewer state.

BACKGROUND

As value, use, access, and demand corresponding to video content distribution continue to increase, content viewers have come to expect that their television receivers offer a number of robust and useful features. Companies are expected to compete to provide better viewer experiences and more tailored service offerings.

There is a need in the television service provider space to provide enhanced viewing features tailored to needs of individual viewers.

BRIEF SUMMARY

The present disclosure relates in general to television devices, and, more specifically, but not by way of limitation, to systems and methods for facilitating enhanced display characteristics based on viewer state.

In one aspect, a method for facilitating enhanced display characteristics based on viewer state is provided. The method may include any one or combination of the following. A media device may process an indication of a first state of a first viewer of a display device that is coupled to the media device. The indication of the first state of the first viewer may be captured at a time corresponding to the display device displaying first content with a first set of one or more size characteristics. The media device may determine a display adjustment based at least in part on the indication of the first state of the first viewer. The media device may cause the display device to display second content in accordance with the display adjustment so that the display device displays at least a portion of the second content with a second set of one or more size characteristics that is different from the first set of one or more size characteristics.

In another aspect, a media device to facilitate enhanced display characteristics based on viewer state is provided. The media device may include one or more processors and a memory communicatively coupled with and readable by the one or more processors and having stored therein processor-readable instructions which, when executed by the one or more processors, cause the one or more processors to perform any one or combination of the following. An indication of a first state of a first viewer of a display device that is coupled to the media device may be processed. The indication of the first state of the first viewer may be captured at a time corresponding to the display device displaying first content with a first set of one or more size characteristics. A display adjustment may be determined based at least in part on the indication of the first state of the first viewer. The display device may be caused to display second content in accordance with the display adjustment so that the display device displays at least a portion of the second content with a second set of one or more size characteristics that is different from the first set of one or more size characteristics.

In yet another aspect, a non-transitory, processor-readable medium comprising processor-readable instructions is provided. The instructions, when executed by one or more processors, may cause the one or more processors to perform any one or combination of the following. An indication of a first state of a first viewer of a display device that is coupled to the media device may be processed. The indication of the first state of the first viewer may be captured at a time corresponding to the display device displaying first content with a first set of one or more size characteristics. A display adjustment may be determined based at least in part on the indication of the first state of the first viewer. The display device may be caused to display second content in accordance with the display adjustment so that the display device displays at least a portion of the second content with a second set of one or more size characteristics that is different from the first set of one or more size characteristics.

In various embodiments, the second content may include one or more of electronic programming guide information, television programming content, and/or advertising content. In various embodiments, the second set of one or more size characteristics may correspond to one or more increased size characteristics with respect to the first set of one or more size characteristics.

In various embodiments, the indication of the first state of the first viewer may indicate a distance from a sensor communicatively coupled to the media device. The determining the display adjustment based at least in part on the indication of the first physical state of the first viewer may include selecting the display adjustment based at least in part on the indicated distance and one or more rules for handling multiple distances of viewers.

In various embodiments, the indication of the first state of the first viewer may indicate one or more facial features of the first viewer. The determining the display adjustment based at least in part on the indication of the first physical state of the first viewer may include selecting the display adjustment based at least in part on the indicated one or more facial features and one or more rules for matching a set of one or more facial features to a set of one or more display adjustments.

In various embodiments, an indication of a second state of a second viewer of the display device may be processed. The display adjustment may be determined based at least in part on the indication of the first state of the first viewer, the indication of the second state of the second viewer, and a set of arbitration rules.

In various embodiments, presentation of a user-selection option relating to the display adjustment may be caused. A user selection corresponding to the user-selection option relating to the display adjustment may be processed. Information enabling unique identification of the first viewer based on facial recognition of an image of the first viewer may be retained. Information about preferences of the first viewer relating to the display adjustment may be retained.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. When only the first reference label is used in the specification, the description is applicable to any one of the similar components having the same first reference label irrespective of the second reference label.

FIGS. 5A and 5B illustrate an example adjustment, in accordance with certain embodiments of the present disclosure.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Certain embodiments according to the present disclosure facilitate enhanced display characteristics based on viewer state. In certain embodiments, a receiving device may be part of a television receiver or may be separate but communicatively coupled to a television receiver. The receiving device may monitor one or more viewers and capture data indicative of viewer state. In certain embodiments, a television receiver may be configured to analyze the data indicative of viewer state, determine one or more adjustments based at least in part on the data indicative of viewer state, and cause the one or more adjustments to be made.

Various embodiments will now be discussed in greater detail with reference to the accompanying figures, beginning with FIG. 1.

Figure 1:
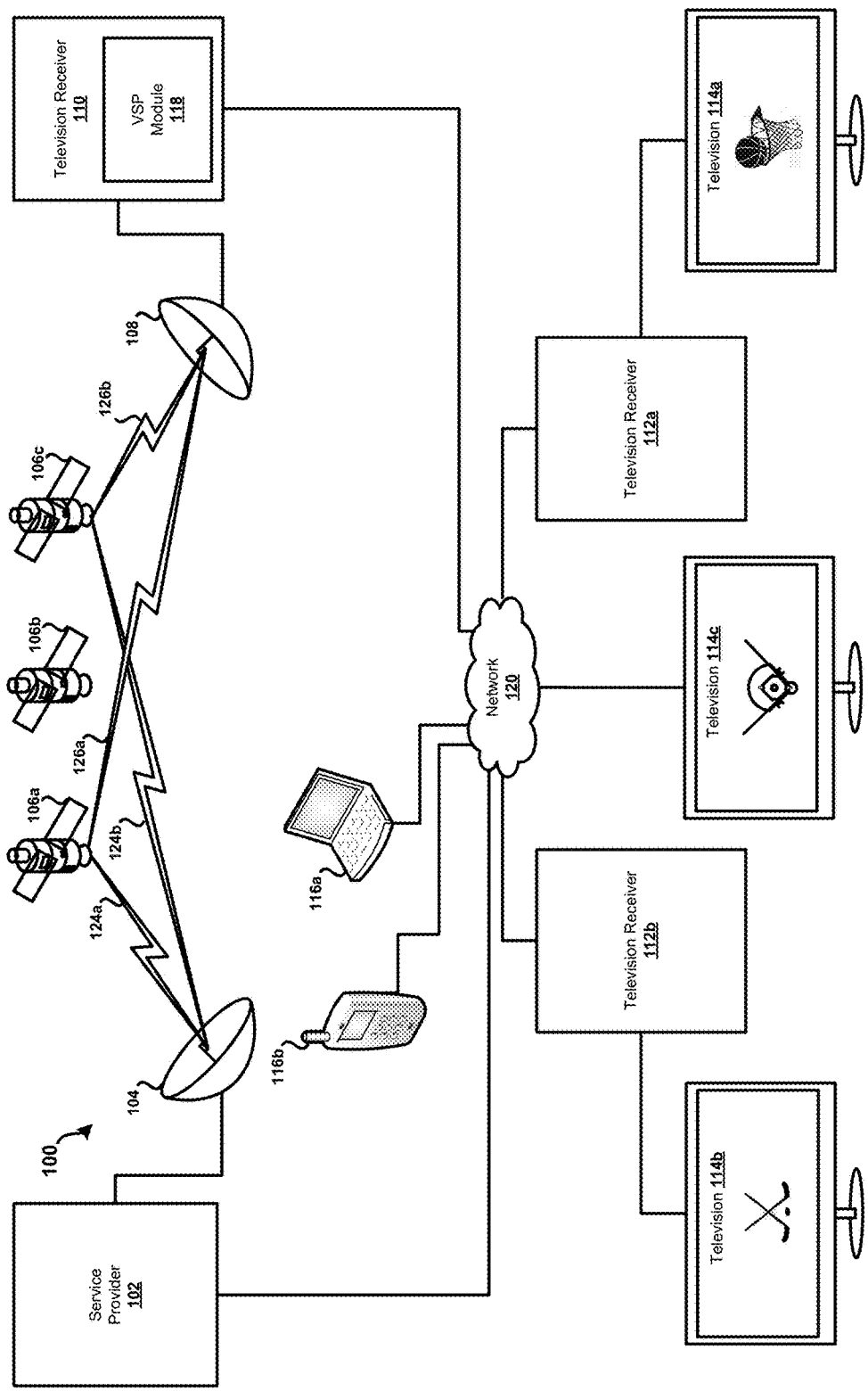
FIG. 1 shows an example media content distribution system, in accordance with certain embodiments of the present disclosure.

FIG. 1 shows an example media content distribution system 100 is shown in which aspects of the present disclosure may be implemented. For brevity, the system 100 is depicted in a simplified and conceptual form, and may generally include more or fewer systems, devices, networks, and/or other components as desired. Further, number and type of features or elements incorporated within the system 100 may or may not be implementation-specific, and at least some of the aspects of the system 100 may be similar to a cable television distribution system, an IPTV (Internet Protocol Television) content distribution system, and/or any other type of media or content distribution system.

The example system 100 may include a service provider 102, a satellite uplink 104, a plurality of orbiting (e.g., geosynchronous) satellites 106a-c, a satellite dish 108, a PTR (Primary Television Receiver) 110, a plurality of STRs (Secondary Television Receivers) 112a-b, a plurality of televisions 114a-c, and a plurality of computing devices 116a-c. In the present example, the PTR 110 may include a viewer-sensitive audiovisual control engine 118. The viewer-sensitive audiovisual control engine 118 may in one aspect be configured to implement or otherwise provide a mechanism for a computer user to facilitate enhanced display and/or operating characteristics based on viewer state in accordance with the present disclosure, as discussed in further detail below.

The system 100 may also include at least one network 120 that establishes a bi-directional communication path for data transfer between and among the PTR 110, STRs 112a-b, televisions 114a-c, and computing devices 116a-c of the example system 100. The network 120 may further establish a bi-directional communication path for data transfer between the PTR 110 and the service provider 102. The network 120 is intended to represent any number of terrestrial and/or non-terrestrial network features or elements. For example, the network 120 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, a cellular communications network, or any other type of communication network configured such that data may be transferred between and among respective elements of the example system 100.

The PTR 110, and the STRs 112a-b, as described throughout may generally be any type of television receiver, such as a STB (Set-Top-Box) for example. In another example, the PTR 110, and the STRs 112a-b, may exhibit functionality integrated as part of or into a television, a DVR, a computer such as a tablet computing device, or any other computing system or device, as well as variations thereof. Further, the PTR 110 and the network 120, together with the STRs 112a-b and televisions 114a-c, and possibly the computing devices 116a-c, may form at least a portion of a particular home computing network, and may each be respectively configured so as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), etc. Other embodiments are possible. For example, one or more of the various elements or components of the example system 100 may be configured to communicate in accordance with the MoCA® (Multimedia over Coax Alliance) home entertainment networking standard. Still Other embodiments are possible.

In practice, the satellites 106a-c may each be configured to receive uplink signals 124a-b from the satellite uplink 104. In this example, the uplink signals 124a-b may contain one or more transponder streams of particular data or content, such as particular television channel, that is supplied by the service provider 102. For example, each of the respective uplink signals 124a-b may contain various media content such a plurality of encoded HD (High Definition) television channels, various SD (Standard Definition) television channels, on-demand programming, programming information, and/or any other content in the form of at least one transponder stream, and in accordance with an allotted carrier frequency and bandwidth. In this example, different media content may be carried using different ones of the satellites 106a-c. Further, different media content may be carried using different transponders of a particular satellite (e.g., satellite 106a); thus, such media content may be transmitted at different frequencies and/or different frequency ranges. For example, a first and second television channel may be carried on a first carrier frequency over a first transponder of satellite 106a, and a third, fourth, and fifth television channel may be carried on second carrier frequency over a first transponder of satellite 106b, or, the third, fourth, and fifth television channel may be carried on a second carrier frequency over a second transponder of satellite 106a, etc.

The satellites 106a-c may further be configured to relay the uplink signals 124a-b to the satellite dish 108 as downlink signals 126a-b. Similar to the uplink signals 124a-b, each of the downlink signals 126a-b may contain one or more transponder streams of particular data or content, such as various encoded and/or at least partially electronically scrambled television channels, on-demand programming, etc., in accordance with an allotted carrier frequency and bandwidth. The downlink signals 126a-b, however, may not necessarily contain the same or similar content as a corresponding one of the uplink signals 124a-b. For example, the uplink signal 124a may include a first transponder stream containing at least a first group or grouping of television channels, and the downlink signal 126a may include a second transponder stream containing at least a second, different group or grouping of television channels. In other examples, the first and second group of television channels may have one or more television channels in common. In sum, there may be varying degrees of correlation between the uplink signals 124a-b and the downlink signals 126a-b, both in terms of content and underlying characteristics.

Continuing with the example implementation scenario, the satellite dish 108 may be provided for use to receive television channels (e.g., on a subscription basis) provided by the service provider 102, satellite uplink 104, and/or satellites 106a-c. For example, the satellite dish 108 may be configured to receive particular transponder streams, or downlink signals 126a-b, from one or more of the satellites 106a-c. Based on the characteristics of the PTR 110 and/or satellite dish 108, however, it may only be possible to capture transponder streams from a limited number of transponders concurrently. For example, a tuner of the PTR 110 may be configured to tune to a single transponder stream from a transponder of a single satellite at a time.

Additionally, the PTR 110, which is communicatively coupled to the satellite dish 108, may subsequently select via tuner, decode, and relay particular transponder streams to the television 114c for display thereon. For example, the satellite dish 108 and the PTR 110 may, respectively, be configured to receive, decode, and relay at least one premium HD-formatted television channel to the television 114c. Programming or content associated with the HD channel may generally be presented "live," or from a recording as previously stored on, by, or at the PTR 110. In this example, the HD channel may be output to the television 114c in accordance with the HDMI/HDCP content protection technologies. Other embodiments are possible. For example, in some embodiments, the HD channel may be output to the television 114c in accordance with the MoCA® (Multimedia over Coax Alliance) home entertainment networking standard. Still other embodiments are possible.

Further, the PTR 110 may select via tuner, decode, and relay particular transponder streams to one or both of the STRs 112a-b, which may in turn relay particular transponder streams to a corresponding one of the television 114a and the television 114a for display thereon. For example, the satellite dish 108 and the PTR 110 may, respectively, be configured to receive, decode, and relay at least one television channel to the television 114a by way of the STR 112a. Similar to the above-example, the television channel may generally be presented "live," or from a recording as previously stored on the PTR 110, and may be output to the television 114a by way of the STR 112a in accordance with a particular content protection technology and/or networking standard. Other embodiments are possible.

Still further, the satellite dish 108 and the PTR 110 may, respectively, be configured to receive, decode, and relay at least one premium television channel to one or both of the computing devices 116a-b. Similar to the above-examples, the television channel may generally be presented "live," or from a recording as previously stored on the PTR 110, and may be output to one or both of the computing devices 116a-b in accordance with a particular content protection technology and/or networking standard. Other embodiments are possible.

Figure 2:
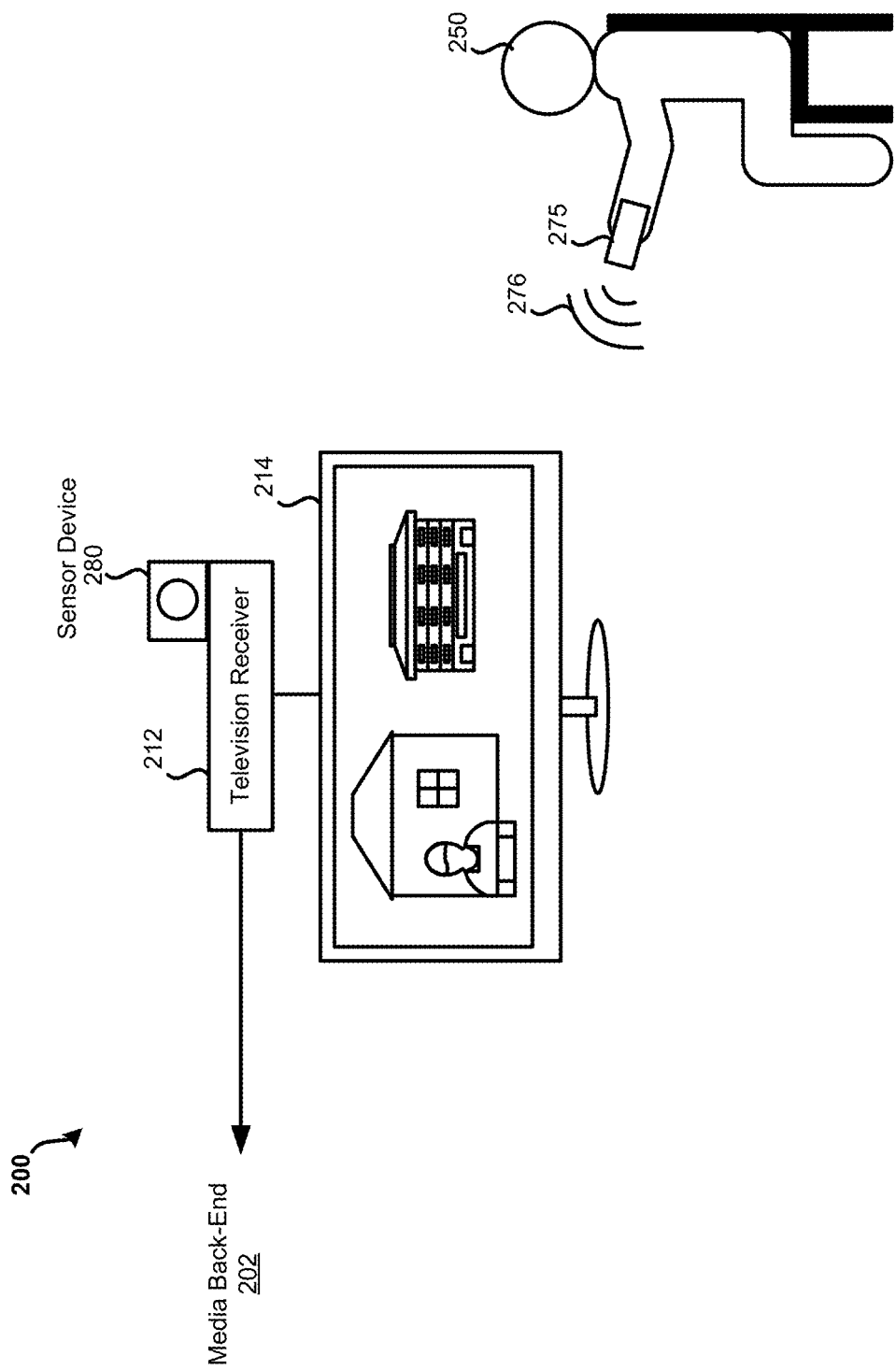
FIG. 2 is a simplified illustration of an embodiment of an end-user system, in accordance with certain embodiments of the present disclosure.

FIG. 2 is a simplified illustration of an embodiment of an end-user system 200, in accordance with certain embodiments of the present disclosure. The end-user system 200 may include the television receiver 210, which may be a set-top box (STB) in certain embodiments, an end-user display device 214, and a sensor device 280. The media service back-end 202 may correspond to certain upstream elements of FIG. 1 communicatively coupled to the end-user system 200. The display 214 can be controlled by a user 250 using a user input device 275 that can send wireless signals 276 to communicate with the television receiver device 212 and/or display 214.

The sensor device 280 may be part of a television receiver 210 or may be separate but communicatively coupled to a television receiver 210 (via wired and/or wireless communication channel(s)). In some embodiments, the sensor device 280 may include one or more cameras configured to have a field of view that may detect one or more viewers in proximity to the television receiver 210. The sensor device 280 may be configured to capture images and/or other indicia of viewer states, such as any one or combination of viewer distinguishing, facial features, facial recognition, a position of the viewer's eyes, a viewer's gaze, a direction in which the viewer's eyes are looking, a position of the viewer's head, eyes movements, gestures, other viewer movements, and/or the like. The television receiver 210 may correspond to the PTR 110 and/or STR(s) 112 of FIG. 1.

Figure 3:
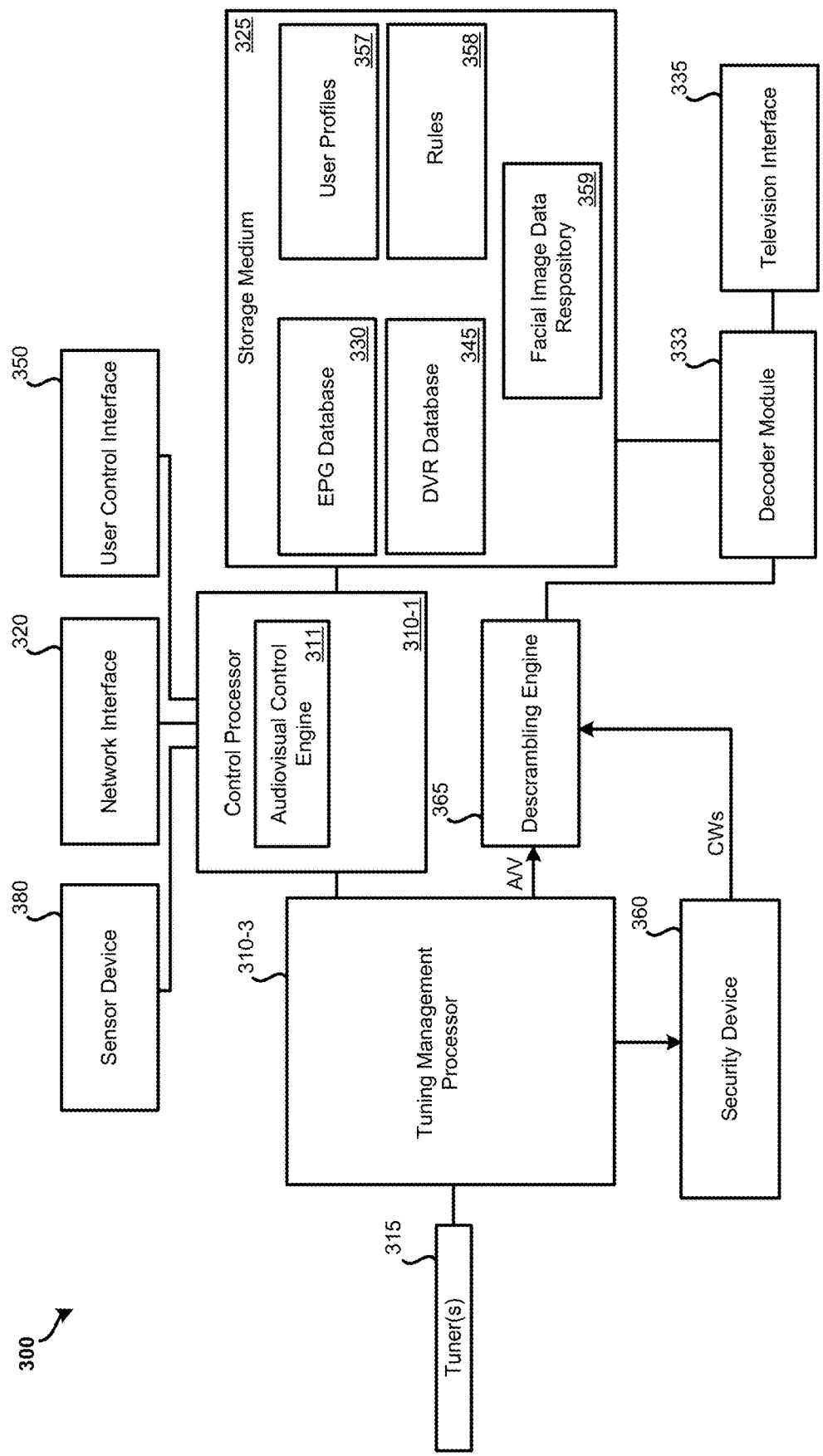
FIG. 3 shows a simplified block diagram of a television receiver, in accordance with certain embodiments of the present disclosure.

FIG. 3 illustrates an embodiment of a television receiver 300, in accordance with certain embodiments of the present disclosure. The television receiver 300 may correspond to the PTR 110 of FIG. 1. In some embodiments, at least one of the STRs 112a-b may be configured in a manner similar to that of the PTR 110. In other embodiments, at least one of the STRs 112a-b may be configured to exhibit a reduced functionality as compared to the PTR 110, and may depend at least to a certain degree on the PTR 110 to implement certain features or functionality. In this example, the STRs 112a-b may be referred to as a "thin client."

Television receiver 300 may be in the form of a separate device configured to be connected with one or more display devices, such as televisions 114. Embodiments of television receiver 300 can include set top boxes (STBs). In addition to being in the form of an STB, a television receiver may be incorporated as part of another device, such as a television, other form of display device, video game console, computer, mobile phone or tablet or the like. For example, a television may have an integrated television receiver (which does not involve an external STB being coupled with the television).

Television receiver 300 may include: processors 310 (which may include control processor 310-1, tuning management processor 310-2, and possibly additional processors), tuners 315, network interface 320, non-transitory computer-readable storage medium 325, electronic programming guide (EPG) database 330, television interface 335, digital video recorder (DVR) database 345 (which may include provider-managed television programming storage and/or user-defined television programming), on-demand programming database 327, remote control interface 350, security device 360, and/or descrambling engine 365. In other embodiments of television receiver 300, fewer or greater numbers of components may be present. It should be understood that the various components of television receiver 300 may be implemented using hardware, firmware, software, and/or some combination thereof. Functionality of components may be combined; for example, functions of descrambling engine 365 may be performed by tuning management processor 310-2. Further, functionality of components may be spread among additional components.

Processors 310 may include one or more specialized and/or general-purpose processors configured to perform processes such as tuning to a particular channel, accessing and displaying EPG information from EPG database 330, and/or receiving and processing input from a user. It should be understood that the functions performed by various modules of FIG. 3 may be performed using one or more processors. As such, for example, functions of descrambling engine 365 may be performed by control processor 310-1.

Control processor 310-1 may communicate with tuning management processor 310-2. Control processor 310-1 may control the recording of television channels based on timers stored in DVR database 345. Control processor 310-1 may also provide commands to tuning management processor 310-2 when recording of a television channel is to cease. In addition to providing commands relating to the recording of television channels, control processor 310-1 may provide commands to tuning management processor 310-2 that indicate television channels to be output to decoder module 333 for output to a display device. Control processor 310-1 may control how many video streams are provided to individual display devices, which may be defined based on user preferences. Control processor 310-1 may also communicate with network interface 320 and remote control interface 350. Control processor 310-1 may handle incoming data from network interface 320 and remote control interface 350. Additionally, control processor 310-1 may be configured to output data via network interface 320.

Tuners 315 may include one or more tuners used to tune to transponders that include broadcasts of one or more television channels. In some embodiments, two, three, or more than three tuners may be present, such as four, six, or eight tuners. Each tuner contained in tuners 315 may be capable of receiving and processing a single transponder stream from a satellite transponder (or from a cable network) at a given time. As such, a single tuner may tune to a single transponder stream at a given time. If tuners 315 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 315 may be used to receive the signal containing the multiple television channels for presentation and/or recording. Tuners 315 may receive commands from tuning management processor 310-2. Such commands may instruct tuners 315 to tune to certain frequencies. In some embodiments, the key combination database (and/or remote control lock rules) are stored and processed by the remote control.

Network interface 320 may be used to communicate via an alternate communication channel with a television service provider, if such communication channel is available. The primary communication channel may be via satellite (which may be unidirectional to television receiver 300) and the alternate communication channel (which may be bidirectional) may be via a network, such as the Internet. Data may be transmitted from television receiver 300 to a television service provider system and from the television service provider system to television receiver 300. Information may be transmitted and/or received via network interface 320. For instance, instructions from a television service provider may also be received via network interface 320, if connected with the Internet. Network interface 320 may also be used to communicate with mobile devices of users, such as mobile devices 112a and 112b via a local wireless network, the Internet, and/or a cellular network.

Storage medium 325 may represent one or more non-transitory computer-readable storage mediums. Storage medium 325 may include memory and/or a hard drive. Storage medium 325 may be used to store information received from one or more satellites, via a cable network, via some other form of television service provider network, and/or information received via network interface 320. Storage medium 325 may store information related to EPG database 330, DVR database 345, and/or on-demand programming 327. Recorded television programs may be stored using storage medium 325 as part of DVR database 345. Storage medium 325 may be partitioned or otherwise divided (such as into folders) such that predefined amounts of storage medium 325 are devoted to storage of television programs recorded due to user-defined timers and stored television programs recorded due to provider-defined timers.

EPG database 330 may store information related to television channels and the timing of programs appearing on such television channels. EPG database 330 may be stored using storage medium 325, which may be a hard drive or solid-state drive. Information from EPG database 330 may be used to inform users of what television channels or programs are popular and/or provide recommendations to the user. Information from EPG database 330 may provide the user with a visual interface displayed by a television that allows a user to browse and select television channels and/or television programs for viewing and/or recording. Information used to populate EPG database 330 may be received via network interface 320, via satellite, or some other communication link with a television service provider (e.g., a cable network). Updates to EPG database 330 may be received periodically. EPG database 330 may serve as an interface for a user to control DVR functions of television receiver 300, and/or to enable viewing and/or recording of multiple television channels simultaneously. Information from EPG database 330 may be output as a video stream to a display device. A particular user may issue commands indicating that an EPG interface be presented. A user issuing a command that an EPG be displayed may constitute a change command.

Decoder module 333 may serve to convert encoded video and audio into a format suitable for output to a display device. For instance, decoder module 333 may receive MPEG video and audio from storage medium 325 or descrambling engine 365 to be output to a television. MPEG video and audio from storage medium 325 may have been recorded to DVR database 345 as part of a previously-recorded television program. Decoder module 333 may convert the MPEG video and audio into a format appropriate to be displayed by a television or other form of display device and audio into a format appropriate to be output from speakers, respectively. Decoder module 333 may have the ability to convert a finite number of television channel streams received from storage medium 325 or descrambling engine 365, simultaneously. For instance, decoders within decoder module 333 may be able to only decode a single television channel at a time. Decoder module 333 may have various numbers of decoders.

Television interface 335 may serve to output a signal to a television (or another form of display device) in a proper format for display of video and playback of audio. As such, television interface 335 may output one or more television channels, stored television programming from storage medium 325 (e.g., television programs from DVR database 345, television programs from on-demand programming 330 and/or information from EPG database 330) to a television for presentation. Television interface 335 may also serve to output a CVM. Television interface 335 may be configured to be connected with multiple display devices. Therefore, different video feeds may be presented via different display devices. Television interface 335 may also be configured to output multiple (e.g., 3, 3, 4, 5, 6, etc.) video streams to a single display device for simultaneous presentation.

Digital Video Recorder (DVR) functionality may permit a television channel to be recorded for a period of time. DVR functionality of television receiver 300 may be managed by control processor 310-1. Control processor 310-1 may coordinate the television channel, start time, and stop time of when recording of a television channel is to occur. DVR database 345 may store information related to the recording of television channels. DVR database 345 may store timers that are used by control processor 310-1 to determine when a television channel should be tuned to and its programs recorded to DVR database 345 of storage medium 325. In some embodiments, a limited amount of storage medium 325 may be devoted to DVR database 345. Timers may be set by the television service provider and/or one or more users of television receiver 300.

DVR database 345 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to television receiver 300 via the television provider's network. For example, in a satellite-based television service provider system, data necessary to create the provider-defined timers at television receiver 300 may be received via satellite. Content from DVR database 345 may be output as a video stream to a display device. A particular user may issue commands indicating that recorded content be presented.

As an example of DVR functionality of television receiver 300 being used to record based on provider-defined timers, a television service provider may configure television receiver 300 to record television programming on multiple, predefined television channels for a predefined period of time, on predefined dates. Channels may be transmitted as part of a single transponder stream such that only a single tuner needs to be used to receive the television channels. Packets for such television channels may be interspersed and may be received and recorded to a file. If a television program is selected for recording by a user and is also specified for recording by the television service provider, the user selection may serve as an indication to save the television program for an extended time (beyond the time which the predefined recording would otherwise be saved). Television programming recorded based on provider-defined timers may be stored to a portion of storage medium 325 for provider-managed television programming storage.

User profiles 357 may include stored user preferences. User profiles 357 may include profiles for multiple users or may include a single profile for the television receiver in general. In some embodiments, a user is permitted to select which user profile of user profiles 357 is active. For instance, a user can log on to television receiver 300. In some embodiments, user profiles 357 may include preferences for customized presentation adjustments disclosed herein. The preferences could include customized viewing characteristics, such as one or more size characteristics for any one or combination of EPG information, programming content, and advertising content. The preferences could include customized viewing characteristics that include one or more audio characteristics, such as volume control for any one or combination of programming content, advertising content, and/or sleep detection features disclosed herein. The user profiles 357 may further include user feedback received from the user regarding customizations. The feedback data may be used to refine the customizations for particular viewers and viewing situations.

Rules 358 may include one or more rules for matching a set of one or more facial features a viewer to a set of one or more display adjustments, as disclosed further herein. In some embodiments, the rules 358 may include one or more arbitration rules for handling situations of multiple viewers, as disclosed further herein.

Remote control interface 350 may receive communications from one or more remote controls (physically separate from television receiver 300) that allow a user to interact with television receiver 300. Remote control interface 350 may receive and send received commands to control processor 310-1, which may then process the commands using audiovisual control engine 311. In some embodiments, it may be possible to load some or all preferences to a remote control. As such, the remote control can serve as a backup storage device for the preferences. In such embodiments, the communication link with the remote control via remote control interface 350 is bidirectional. Remote control interface 350 may be configured to receive commands from one or more remote controls. Remote control interface 350 may receive commands via BLUETOOTH, NFC, an IR-implemented protocol, an RF-implemented protocol, or some other communication protocol.

Security device 360, which may be implemented as a smart card, may be used for decrypting incoming data. The decrypted data may be used by descrambling engine 365 for descrambling video and/or audio. Descrambled video and/or audio may be output by descrambling engine 365 to storage medium 325 for storage (in DVR database 345) and/or to decoder module 333 for output to a television or other presentation equipment via television interface 335.

Tuning management processor 310-2 may be in communication with tuners 315 and control processor 310-1. Tuning management processor 310-2 may be configured to receive commands from control processor 310-1. Such commands may indicate when to start/stop receiving and/or recording of a television channel and/or when to start/stop causing a television channel to be output to a television. Tuning management processor 310-2 may control tuners 315. Tuning management processor 310-2 may provide commands to tuners 315 that instruct the tuners which satellite, transponder, and/or frequency to tune to. From tuners 315, tuning management processor 310-2 may receive transponder streams of packetized data.

The television receiver 300 may include a sensor device 380, which may correspond to sensor device 280 of FIG. 2. The television receiver 300 and the sensor device 380 may be configured to facilitate enhanced display and/or operating characteristics based on viewer state in accordance with the present disclosure, as discussed in further detail herein. The sensor device 380 may be part of a television receiver 300 or may be separate but communicatively coupled to a television receiver 300 (via wired or wireless communication channel(s)).

The sensor device 380 may include any suitable sensors, controller(s), processor(s), memory, communication interface(s), and other components to facilitate various embodiments disclosed herein. The sensor device 380 may include any sensor circuitry necessary to facilitate the various embodiments, including without limitation any one or combination of analog-to-digital converter circuitry, multiplexer circuitry, amplification circuitry, signal conditioning/translation circuitry, and/or the like. In some embodiments, the sensor device 380 may include one or more cameras configured to have a field of view that may detect one or more viewers in proximity to the television receiver 300. In some embodiments, the sensor device 380 may include head, eye, gaze, motion, and/or other tracking devices; light sensors; ambient light photo sensors; photodiode photo sensors; optical detectors; photo detectors; color sensors; and/or the like. The sensor device 380 may be configured to capture images and/or other indicia of viewer states, such as any one or combination of viewer distinguishing, facial features, facial recognition, a position of the viewer's eyes, a viewer's gaze, a direction in which the viewer's eyes are looking, a position of the viewer's head, eyes movements, gestures, other viewer movements, and/or the like.

The television receiver 300 and/or the sensor device 380 may be configured to execute instructions to perform specific acts to receive, format, interpret, process and/or make decisions regarding received information indicative of viewer states. In some embodiments, the control processor 310-1 may include an audiovisual control engine 311 that may be configured to make decisions regarding received information indicative of viewer states. The audiovisual control engine 311 may manage adjustments, which may be video and/or audio adjustments, based on viewer states. In some embodiments, such management may be based at least in part on facial features identifying a particular user or users, user profile information 357, and/or the rules 358. The audiovisual control engine 311 may cause output via television interface 335 that facilitates adjustments for particular viewers and viewer states.

Some embodiments could employ facial recognition as part of the audiovisual control engine 311. For example, in conjunction with the sensor device 380, the image handling features of the audiovisual control engine 311 could use facial recognition to monitor the viewers for a particular individual that may be a known viewer or may be a new viewer. In some embodiments, the image handling features of the audiovisual control engine 311 may perform correlation of images captured with the sensor device 380 to reference images in a facial image data repository 359, which could be included in or otherwise linked to the user profiles 357 with image data associated with user information for particular users, to identify a known viewer or a new viewer. The facial data could include any suitable facial trait qualifications for specific individuals in any suitable form for correlation.

For simplicity, television receiver 300 of FIG. 3 has been reduced to a block diagram; commonly known parts, such as a power supply, have been omitted. Further, some routing between the various modules of television receiver 300 has been illustrated. Such illustrations are for exemplary purposes only. The state of two modules not being directly or indirectly connected does not indicate the modules cannot communicate. Rather, connections between modules of the television receiver 300 are intended only to indicate possible common data routing. It should be understood that the modules of television receiver 300 may be combined into a fewer number of modules or divided into a greater number of modules. Further, the components of television receiver 300 may be part of another device, such as built into a television. Television receiver 300 may include one or more instances of various computerized components, such as disclosed in relation to computer systems disclosed further herein.

While the television receiver 300 has been illustrated as a satellite receiver, it is to be appreciated that techniques below may be implemented in other types of television receiving devices, such as cable receivers, terrestrial receivers, IPTV receivers or the like. In some embodiments, the television receiver 300 may be configured as a hybrid receiving device, capable of receiving content from disparate communication networks, such as satellite and terrestrial television broadcasts. In some embodiments, the tuners may be in the form of network interfaces capable of receiving content from designated network locations. Further, as previously detailed, the electronic device that interacts with the remote control may be some other type of device entirely. For example, a receiver may have audiovisual control engine 311.

Figure 4:
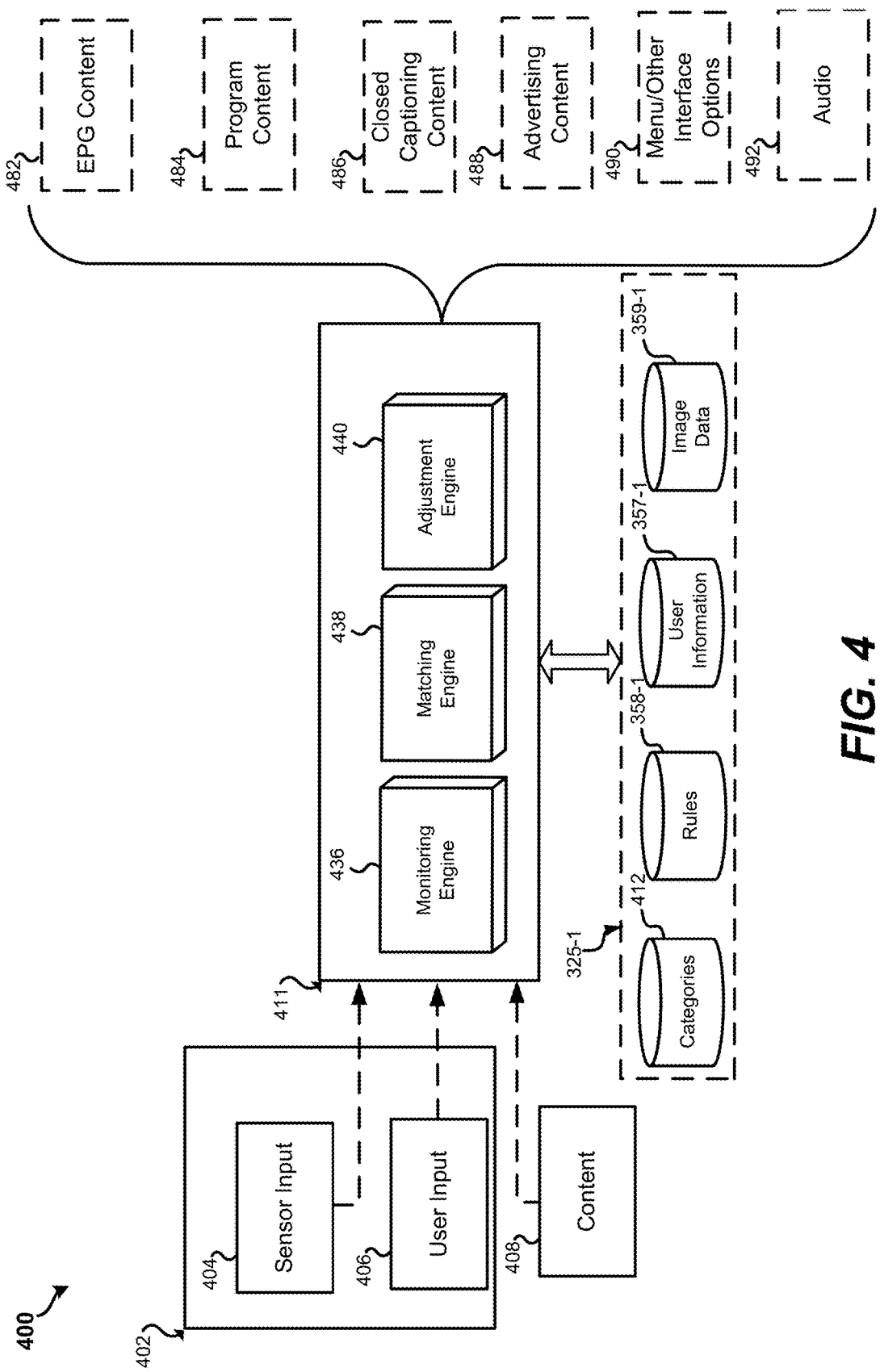
FIG. 4 illustrates a functional diagram of a subsystem for facilitating enhanced presentation based on viewer state, in accordance with certain embodiments of the present disclosure.

FIG. 4 illustrates a functional diagram of a subsystem 400 for facilitating enhanced presentation based on viewer state, in accordance with certain embodiments of the present disclosure. In some embodiments, the subsystem 400 may correspond to aspects of the television receiver 300 in conjunction with the sensor device 380 which may or may not be included in the television receiver 300. As depicted, the subsystem 400 includes an audiovisual control engine 411, which may correspond to the audiovisual control engine 311 in certain embodiments. The audiovisual control engine 411 may be communicatively coupled with interface components and communication channels (e.g., of the television receiver 300, which may take various forms in various embodiments as disclosed herein) configured to receive adjustment input 402.

As depicted, the adjustment input 402 may include sensor input 404. The sensor input 404 may be captured by the sensor device 380 disclosed herein. The audiovisual control engine 411 may include a monitoring engine 436 configured to monitor the adjustment input 401 for any suitable aspects pertaining to viewers. For example, the monitoring engine 436 may process information enabling unique identification of viewers and viewer states. The audiovisual control engine 411 may include a matching engine 438.

The matching engine 338 could use facial recognition to match particular viewer data to image data 359-1 retained for users of the system to determine whether a sensed viewer is a known viewer a new viewer. Captured viewer image data may be correlated to reference images 359-1 using any suitable facial trait qualifications for correlation. The matching engine 338 link particular viewer image data to user profiles 357-1 with image data associated with user information for particular users, to identify a known viewer or a new viewer.

The matching engine 438 may be configured to match particular viewer information captured via the monitoring engine 436 to one or more categories from a set of categories 412. In some embodiments, the matching engine 338 can receive sensor data corresponding to one or more viewers, identify attributes of the one or more viewers based at least in part on the sensor data, and match the one or more viewers to one or more categories from a category information repository 412. Any suitable category may be employed to facilitate adjustment features in accordance various embodiments. By way of example, category information may include categories and corresponding criteria to qualify for particular categories such as viewer difficulty in seeing content displayed which may be linked with detected viewer states such squinting, leaning forward, head tilting, looking over glasses, and/or the like. Other categories could include sleepiness, disinterestedness, distraction, and/or the like, with corresponding criteria directed to eye state, facial state, and/or the like. In some embodiments, the rules 358 may include criteria for matching a set of indicia of viewer state to a set of one or more categories. In some embodiments, the rules 358 may include criteria for matching a set of one or more categories to a set of one or more display adjustments.

Some embodiments may allow for matching viewers with other viewers. For example, if it is determined that one or more of the viewer characteristics do not match characteristics associated with one or more categories, it may be determined whether one or more of the characteristics match another already categorized viewer. The one or more characteristics can be compared with those of another viewer. If characteristics matched with a second viewer satisfy a threshold, the viewer can be determined to match with the category of the second viewer. Then, the viewer can be associated with the category of the second viewer.

The audiovisual control engine 411 may include an adjustment engine 440 which may be configured to cause one or more adjustments. The television receiver may receive content 408 for potential adjustment, which content 408 could include any one or combination of EPG content, program content, closed captioning content, advertising content, and/or audio content. In various embodiments, a set of one or more adjustments may include any one or combination of EPG content adjustment 482, program content adjustment 484, closed captioning content adjustment 486, advertising content adjustment 488, and/or audio content adjustment 492.

By way of example, it could be determined that a display adjustment is appropriate based at least in part on indicia of first state of a first viewer. For example, the monitoring engine 436 may have captured sensor input 404 regarding the first viewer, and the matching engine 438 may have correlated image data regarding the first viewer to indicia of squinting and a corresponding category of viewer state that the viewer is have difficulty seeing content displayed. The adjustment engine 440 may determine that the content corresponding to the difficulty is any one or combination of EPG content, program content, closed captioning content, and/or advertising content.

In some embodiments, the adjustment engine 440 may further determine a particular portion of the content that should be adjusted. For example, based on the sensor input 404, it may be determined that the viewer is focusing on a particular portion of the screen. This particular portion of the screen could correspond to text or other detailed content. In some embodiments, the particular portion of the content that should be adjusted could be determined to be the center of the screen (e.g., which could be a default setting in the absence of further sensor input indicating another portion of the screen). The adjustment engine 440 may determine that the particular content is being displayed with a first set of one or more size characteristics. The first set of one or more size characteristics could correspond to normal (i.e., unadjusted) size characteristics in some cases. The adjustment engine 440 may cause the display device to display the particular content in accordance with a determined display adjustment so that at least a portion of the content is displayed with increased size characteristics.

In some embodiments, text size may be adjusted. For example, text size of the EPG content and/or the closed captioning content could be increased for better readability. In some embodiments, the content 408 may be received by the adjustment engine 440 and modified in accordance with a determined adjustment. In some cases, the adjustment may involve altering display settings and outputting commands to the display device to display content per altered display settings. Some embodiments, the adjustment made of altering content parameters (e.g., font size parameters). In some embodiments, the television receiver may identify content portions for adjustment by processing the content 408, reading the content 408 or certain portions thereof, and determine portions for adjustment in video segments. In some embodiments, entire picture, image, and/or frame may be overwritten; in some embodiments, only a portion thereof may be overwritten.

In some embodiments, the adjustment may involve a zoom operation. FIGS. 5A and 5B illustrate an example adjustment, in accordance with certain embodiments of the present disclosure. FIG. 5A depicts an example display 502 of an EPG that may be displayed on the display device 114. The example display 502 shows an EPG view that takes up the entire screen of the display device 114. In some embodiments, the EPG view may not take up the entire screen, but only a portion, such as a lower portion, a side portion, a combination of lower and side portions, etc. In some embodiments, a viewing window that may display a program may be displayed in addition to the EPG view. The EPG view 502 shows a certain view of the overall EPG information with certain times 504, certain channels 506, and certain corresponding programs 508. The EPG view 502 may exemplify what a viewer may see prior to an adjustment to increase size characteristics. And, in an example case, the viewer squinting to see EPG view 502, and that viewer state may be detected as described herein.

FIG. 5B depicts an example EPG view 510 corresponding to an adjustment implemented by certain embodiments. The EPG view 510 represents an expanded view encapsulating times 514 that are a subset of the times 504 of the previous view 502 and that have a lesser range than the times 504 of the previous view 502. The expanded EPG view 510 also encapsulates channels 516 that are a subset the channels 506 of the previous view 502. The expanded EPG view 510 also encapsulates programs 518 corresponding to the times 514 and the channels 516. Accordingly, a zoom operation or other adjustment of at least a portion of the EPG content may afford an expanded perspective tailored to the viewer who was previously detected to be having trouble viewing the content, as indicated by the viewer squinting.

Further, the example EPG view 510 generally corresponds to an off-center portion of the previous view 502. The viewer may have been focusing on that portion of the screen in the view 502. Having detected that viewer focus, a portion of that content corresponding to that portion screen is selected for enhancement. In other embodiments, the center of the view 502 could be selected as default.

Referring again to FIG. 4, similar adjustments could be made to program content 484, closed captioning content 486, advertising content 488, and/or menu or other user interface options (e.g., presented to the user with television receiver and/or display device), with a zoom operation, content modification, and/or the like in various embodiments. In addition, certain embodiments may adjustments audio content 492. For example, responsive to a detection of viewer sleeping, the volume of the audio may be decreased to not disturb the viewer. Or, in some cases, a viewer may wish to have the volume increased in order to awaken the viewer, and such an option could be indicated by the viewer via user-select options disclosed herein.

Figure 6:
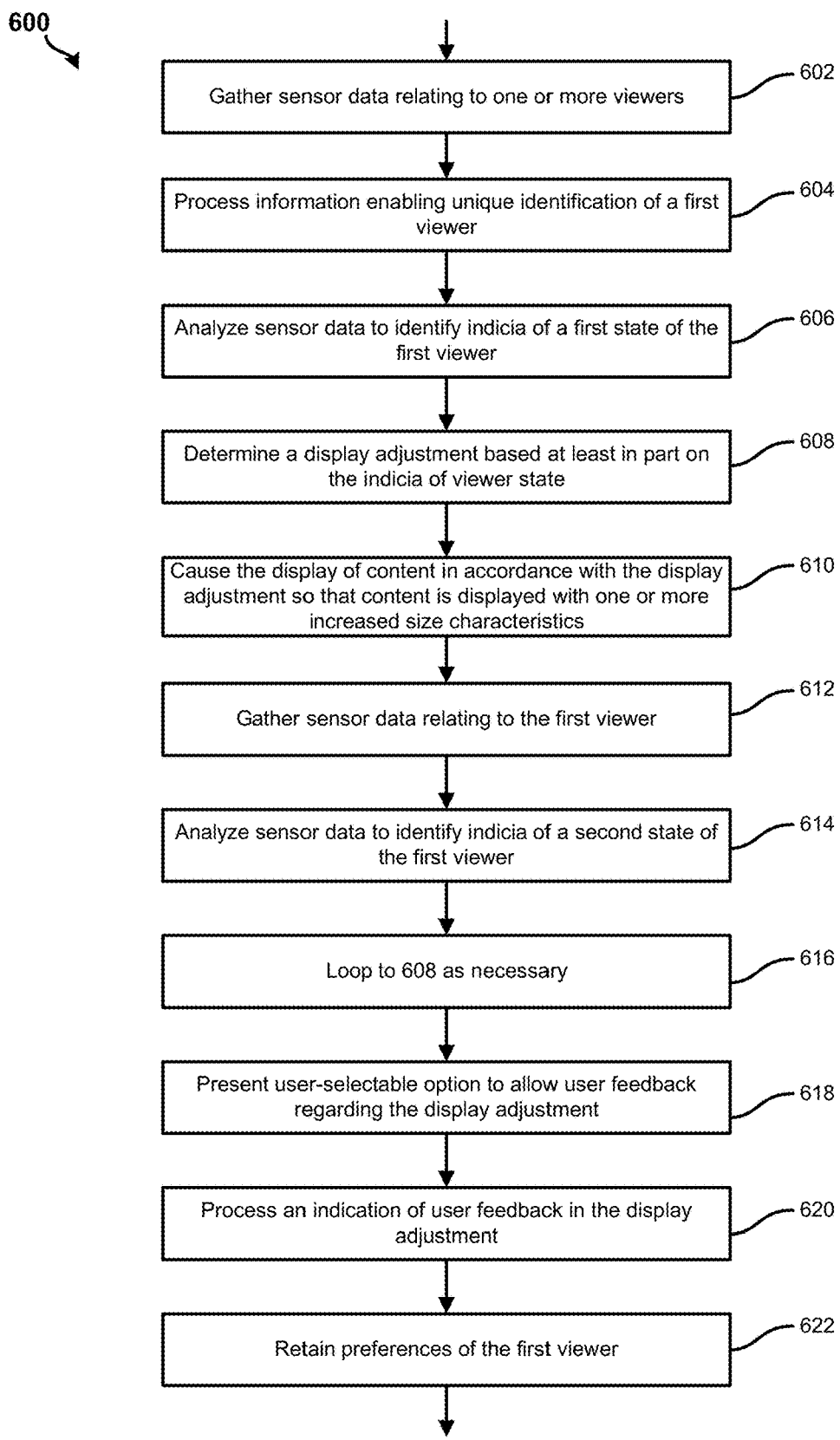
FIG. 6 illustrates an example method of certain features directed to tailoring adjustments based on viewer state, in accordance with certain embodiments of the present disclosure.

FIG. 6 is a block diagram that illustrates an example method 600 of certain features directed to tailoring adjustments based on viewer state, in accordance with certain embodiments of the present disclosure. According to certain embodiments, the method 600 may begin as indicated by block 602. Teachings of the present disclosure may be implemented in a variety of configurations. As such, the order of the steps comprising the method 600 and/or other methods disclosed herein may be shuffled or combined in any suitable manner and may depend on the implementation chosen. Moreover, while the following steps may be separated for the sake of description, it should be understood that certain steps may be performed simultaneously or substantially simultaneously.

As indicated by block 602, sensor data relating to one or more viewers may be gathered. The sensor data may be gathered continuously. As indicated by block 604, information enabling unique identification of a first viewer may be processed. By way of example, the monitoring engine 436 may gather data via the sensor device 380, and the matching engine 438 may uniquely identify the first viewer based on facial recognition and image data 359.

As indicated by block 606, sensor data may be analyzed to identify indicia of a first state of the first viewer. The analysis could be performed at any suitable time, including at a time of initial identification of the viewer and/or at any time or number of times thereafter. And, the first state may not necessarily be an initial state of the viewer, but may be any subsequent state of the viewer detected at any time after initial detection of the viewer. As indicated by block 608, a display adjustment may be determined based at least in part on the indicia of the first state of the first viewer. Continuing an example case described above, the matching engine 438 may correlate image data regarding the first viewer to indicia of squinting and a corresponding category of viewer state that the viewer is have difficulty seeing content displayed, and the adjustment engine 440 may identify the content that the viewer is having difficulty seeing. However, embodiments are not limited to situations of viewers having difficulty seeing content, but could include any suitable adjustment based on any suitable viewer state.

As indicated by block 610, the display of content in accordance with the display adjustment may be caused so that content is displayed with one or more increased size characteristics. As disclosed herein, various embodiments may include an adjustment of display settings, an adjustment of content parameters, content modification, navigational operations, volume settings, and/or the like.

As indicated by block 612, the gathering of sensor data relating to the first viewer may continue after the adjustment, in some embodiments, to determine the effectiveness of the adjustment. As indicated by block 614, the sensor data may be analyzed to identify indicia of a second state of the first viewer. In some embodiments, as indicated by block 616, the method flow may loop to block 608 to further adjust the content in view of the indicia of the second state, as necessary. The adjustments could be an iterative/heuristic process to aid the viewer. For example, small adjustments could be made until the viewer stops squinting.

As indicated by block 618, one or more user-selectable options may be presented via the television receiver, display device, and/or remote control device to allow for user feedback regarding the adjustment. Any suitable option to allow the user confirm the adjustment, reject the adjustment, indicate preferences regarding additional adjustments, customize adjustments/user profiles/viewing situations, and/or the like may be employed in various embodiments. As indicated by block 620, an indication of user feedback in the display adjustment may be processed. For example, the viewer may confirm and keep the adjustment applied. Or, the viewer may reject the adjustment. As indicated by block 622, preferences of the first may retained for subsequent enhancements.

In some embodiments, the adjustment may be applied for as long as certain types of content are displayed. For example, an adjustment to EPG content may be applied as long as the viewer views the EPG content so that, when a user navigates away from the EPG (e.g., to program content), no further adjustment is applied until another trigger (say, the user views EPG content again, or starts squinting again when viewing other types of content).

In some embodiments, an initialization or calibration process may be performed in which the user is prompted on the display device to look at a particular location on the screen of the display device. The user may then indicate with a remote control device that the user is looking at the particular location on the screen of the display. The current direction or position of the user's eye captured by the camera will be associated with the user looking at the particular location on the screen. Similar initialization or calibration processes may be performed for other user aspects, such as various movements, head positions, gestures, locations, distances, etc. This initialization/calibration may be repeated for various other locations on the display, various viewer locations, and at various times for increased accuracy and precision in determining which location on a display the user is currently looking at. For example, this initialization/calibration may be performed each time it is determined that the user has moved over a threshold amount. The calibration data may be stored for configuring the system components.

Figure 7:
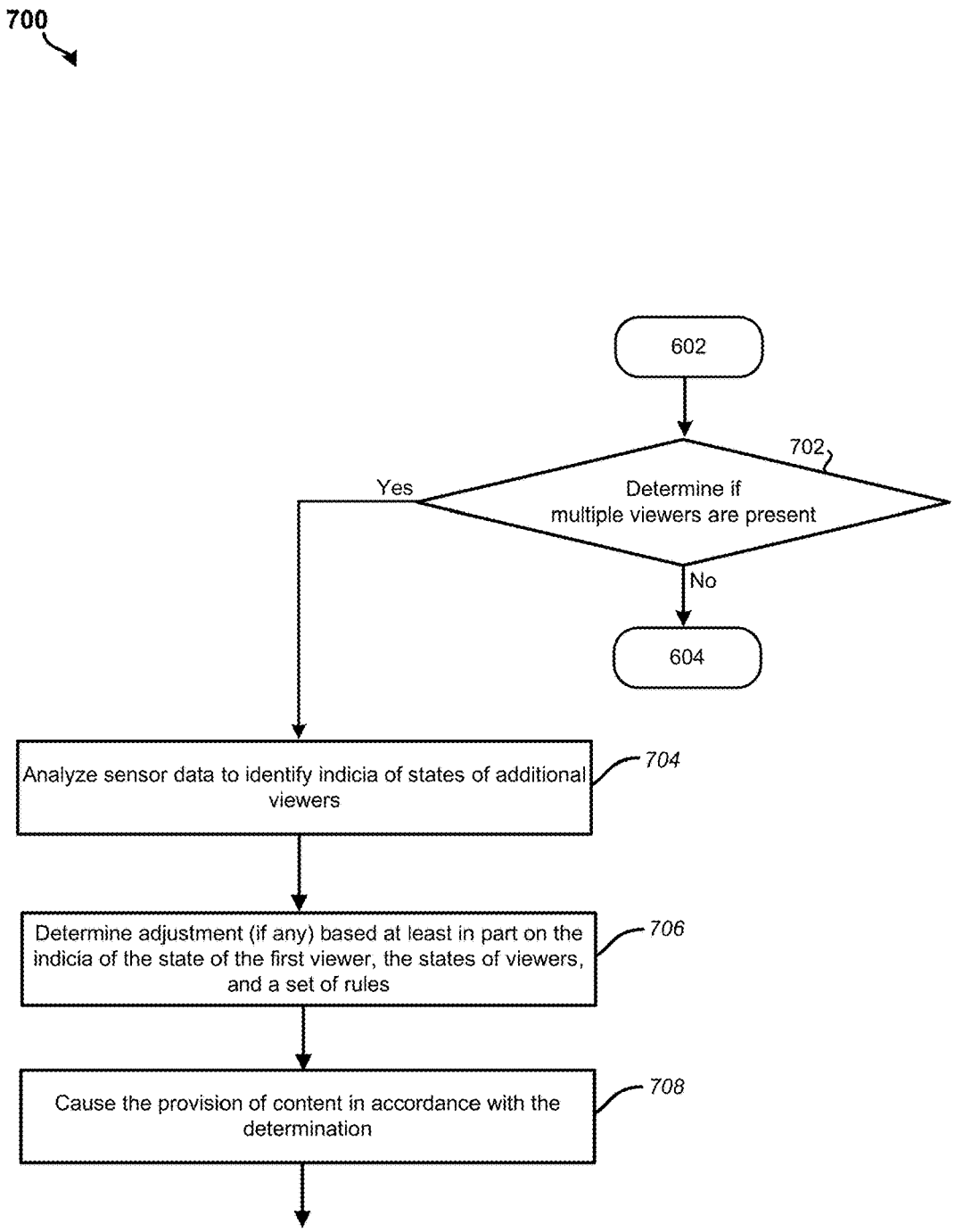
FIG. 7 illustrates an example method of certain features directed to tailoring adjustments based on multiple-viewer situations, in accordance with certain embodiments of the present disclosure.

FIG. 7 is a block diagram that illustrates an example method 700 of certain features directed to tailoring adjustments based on multiple-viewer situations, in accordance with certain embodiments of the present disclosure. According to certain embodiments, the method 700 may begin as indicated by block 602 of method 600 by gathering sensor data relating to one or more viewers. As indicated by block 702, it may be determine if multiple viewers are present. In the case that only one viewer is present, the method may flow back to block 604 of method 600.

However, if it is determined that multiple viewers are present, flow may proceed to block 704. As indicated by block 704, sensor data may be analyzed to identify indicia of states of additional viewers. As indicated by block 706, a determination that an adjustment is appropriate (or that no adjustment should be applied) may be based at least in part on the indicia of the state of the first viewer, the states of viewers, and a set of rules 358. As indicated by block 708, the provision of content may be caused in accordance with the determination.

In some embodiments, the set of rules 358 may include arbitration rules for handling multi-viewer situations. In some embodiments, the arbitration rules may provide for determining whether multiple viewers present are actually looking at the screen. For example, though multiple viewers may be present, it may be determined that only one viewer is actually viewing the content displayed. Others could be determined to be in various viewer states such as asleep or looking off-screen for a time period that satisfies a particular time threshold corresponding to non-attentiveness. Some embodiments may further determine that only one viewer is actually viewing the content displayed based on that one viewer looking at the screen for a time period that satisfies a particular time threshold corresponding to attentiveness. In some embodiments, the time periods and thresholds for attentiveness and non-attentiveness could be the same; in other embodiments, the time periods and thresholds for attentiveness and non-attentiveness could be different. In the case of a determination of only one viewer actually viewing the content displayed, the process flow may proceed to block 606 of method 600, in some embodiments.

In some embodiments, the arbitration rules may provide for determining whether any viewer is need of adjustment (e.g., in need of increased content size adjustment), and automatically applying the adjustment consequent to determining that there is a need. In some embodiments, the arbitration rules may provide for providing a suggestion of the adjustment to the viewers with one or more user-selectable options, and only applying the adjustment if a corresponding user selection to accept the adjustment is received. In some embodiments, the arbitration rules may provide for applying adjustments based on user preferences and uniquely identifying the viewers present. For example, if a particular viewer is determined to be present, the user preferences may provide that preferences of the particular viewer are controlling even in multi-viewer situations and that adjustments are to be applied according to those particular preferences and/or based only on that particular viewer.

Figure 8:
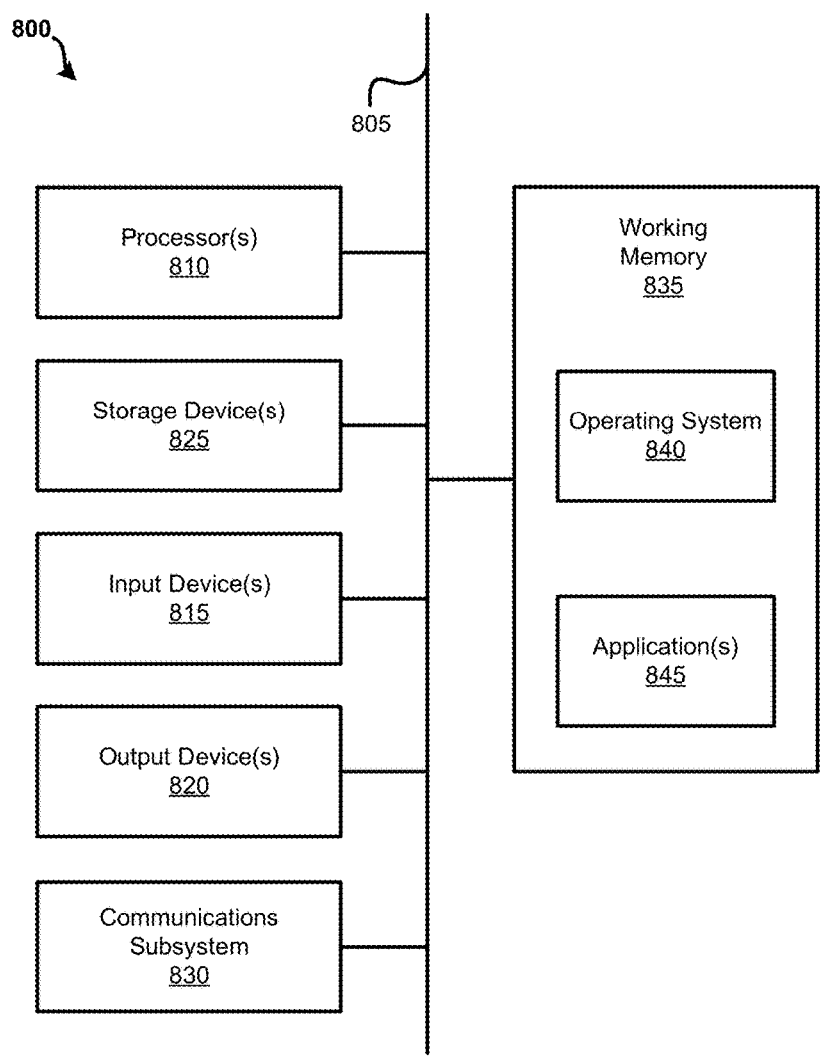
FIG. 8 shows an example computing system or device, in accordance with certain embodiments of the present disclosure.

A computer system as illustrated in FIG. 8 may be incorporated as part of the previously described computerized devices. For example, computer system 800 can represent some of the components of the television receivers, computerized user devices, and/or television service provider systems discussed in this application. FIG. 8 provides a schematic illustration of one embodiment of a computer system 800 that can perform the methods provided by various embodiments. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, and/or the like); one or more input devices 815, which can include without limitation a mouse, a keyboard, and/or the like; and one or more output devices 820, which can include without limitation a display device, a printer, and/or the like.

The computer system 800 may further include (and/or be in communication with) one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 830 may permit data to be exchanged with a network (such as the network described below, to name one example), other computer systems, and/or any other devices described herein. In many embodiments, the computer system 800 will further comprise a working memory 835, which can include a RAM or ROM device, as described above.

The computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 825 described above. In some cases, the storage medium might be incorporated within a computer system, such as computer system 800. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 800) to perform methods in accordance with various embodiments of the present disclosure. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the non-transitory storage device(s) 825. Merely by way of example, execution of the sequences of instructions contained in the working memory 835 might cause the processor(s) 810 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 830 (and/or components thereof) generally will receive signals, and the bus 805 then might carry the signals (and/or the data, instructions, etc. carried by the signals) to the working memory 835, from which the processor(s) 810 retrieves and executes the instructions. The instructions received by the working memory 835 may optionally be stored on a non-transitory storage device 825 either before or after execution by the processor(s) 810.

It should further be understood that the components of computer system 800 can be distributed across a network. For example, some processing may be performed in one location using a first processor while other processing may be performed by another processor remote from the first processor. Other components of computer system 800 may be similarly distributed.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Moreover, the teachings of the present disclosure may be applied not only to television programming, but also may be applied to any video stream. For example, the teachings may be applied to IP content, DVD content, etc. And, in addition, the teachings of the present disclosure are not limited to television receivers, but also may be applied to any media device and corresponding display method, including, by way of example without limitation, projectors, smart glasses, and the like.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of embodiments of the present disclosure. Also, a number of steps may be undertaken before, during, or after the above elements are considered. Accordingly, the above description does not bind the scope of the claims.

What is claimed:

1. A method comprising:
   capturing sensor input indicative of an individual proximate to a display device that is coupled to a media device;
   determining a first change in a set of one or more facial features of the individual at least in part by:
     processing a first subset of the sensor input that indicates a first state of the individual when the individual is proximate to the display device;
     processing a second subset of the sensor input that indicates a second state of the individual when the individual is proximate to the display device, wherein the second state is different from the first state;
   matching the first change in the set of one or more facial features of the individual to a category and a set of one or more user preferences stored by the media device, where the category corresponds to a recognized change in facial features;
   determining an adjustment based at least in part on the category and the set of one or more user preferences stored by the media device, the determining the adjustment comprising causing the display device to present content in accordance with a plurality of iterative adjustments until a subsequent change in the set of one or more facial features of the individual is detected;
   causing the display device to present a user-selectable option to indicate feedback regarding the adjustment; and
   processing an indication of a selection of the user-selectable option, and causing the display device to present content in accordance with the selection.

2. The method of claim 1, wherein the user-selectable option corresponds to an option to select or reject the adjustment.

3. The method of claim 2, wherein the selection corresponds to a rejection of the adjustment, and the method further comprises not applying the adjustment responsive to the rejection of the adjustment.

4. The method of claim 3, further comprising:
   changing the set of one or more user preferences based at least in part on the rejection of the adjustment; and
   storing the changed set of one or more user preferences by the media device.

5. The method of claim 2, wherein the selection corresponds to an acceptance of the adjustment, and the method further comprises applying the adjustment responsive to the acceptance of the adjustment.

6. The method of claim 1, further comprising:
   causing the display device to present the content in accordance with the adjustment applied prior to receiving the selection of the user-selectable option;
   wherein the causing the display device to present the content in accordance with the selection corresponds to retaining or not retaining the adjustment applied, depending on the selection.

7. The method of claim 1, wherein the selection corresponds to customization of the adjustment and/or a specification of a viewing situation.

8. A media device comprising:
   one or more processors; and
   a memory communicatively coupled with and readable by the one or more processors and having stored therein processor-readable instructions which, when executed by the one or more processors, cause the media device to perform:
     capturing sensor input indicative of an individual proximate to a display device that is coupled to the media device;
     determining a change in a set of one or more facial features of the individual at least in part by:
       processing a first subset of the sensor input that indicates a first state of the individual when the individual is proximate to the display device;
       processing a second subset of the sensor input that indicates a second state of the individual when the individual is proximate to the display device, wherein the second state is different from the first state;
     matching the change in the set of one or more facial features of the individual to a category and a set of one or more user preferences stored by the media device, where the category corresponds to a recognized change in facial features;
     determining an adjustment based at least in part on the category and the set of one or more user preferences stored by the media device, the determining the adjustment comprising causing the display device to present content in accordance with a plurality of iterative adjustments until a subsequent change in the set of one or more facial features of the individual is detected;

causing the display device to present a user-selectable option to indicate feedback regarding the adjustment; and processing an indication of a selection of the user-selectable option, and causing the display device to present content in accordance with the selection.

9. The media device of claim 8, wherein the user-selectable option corresponds to an option to select or reject the adjustment.

10. The media device of claim 9, wherein the selection corresponds to a rejection of the adjustment, the media device to further perform not applying the adjustment responsive to the rejection of the adjustment.

11. The media device of claim 10, the media device to further perform:

changing the user preferences based at least in part on the rejection of the adjustment; and storing the changed user preferences by the media device.

12. The media device of claim 9, wherein the selection corresponds to an acceptance of the adjustment, the media device to further perform applying the adjustment responsive to the acceptance of the adjustment.

13. The media device of claim 8, the media device to further perform:

causing the display device to present the content in accordance with the adjustment applied prior to receiving the selection of the user-selectable option;

wherein the causing the display device to present the content in accordance with the selection corresponds to retaining or not retaining the adjustment applied, depending on the selection.

14. The media device of claim 8, wherein the selection corresponds to customization of the adjustment and/or a specification of a viewing situation.

15. One or more non-transitory, machine-readable media comprising processor-readable instructions which, when executed by one or more processing devices, cause the one or more processing devices to perform:

capturing sensor input indicative of an individual proximate to a display device that is coupled to a media device;

determining a change in a set of one or more facial features of the individual at least in part by:

processing a first subset of the sensor input that indicates a first state of the individual when the individual is proximate to the display device;

processing a second subset of the sensor input that indicates a second state of the individual when the individual is proximate to the display device, wherein the second state is different from the first state;

matching the change in the set of one or more facial features of the individual to a category and a set of one or more user preferences stored by the media device, where the category corresponds to a recognized change in facial features;

determining an adjustment based at least in part on the category and the set of one or more user preferences stored by the media device, the determining the adjustment comprising causing the display device to present content in accordance with a plurality of iterative adjustments until a subsequent change in the set of one or more facial features of the individual is detected;

causing the display device to present a user-selectable option to indicate feedback regarding the adjustment; and processing an indication of a selection of the user-selectable option, and causing the display device to present content in accordance with the selection.

16. The one or more non-transitory, machine-readable media of claim 15, wherein the user-selectable option corresponds to an option to select or reject the adjustment.

17. The one or more non-transitory, machine-readable media of claim 16, wherein the selection corresponds to a rejection of the adjustment, the one or more processing devices further to perform not applying the adjustment responsive to the rejection of the adjustment.

18. The one or more non-transitory, machine-readable media of claim 17, the one or more processing devices further to perform:

changing the user preferences based at least in part on the rejection of the adjustment; and storing the changed user preferences by the media device.

19. The one or more non-transitory, machine-readable media of claim 16, wherein the selection corresponds to an acceptance of the adjustment, the one or more processing devices further to perform applying the adjustment responsive to the acceptance of the adjustment.

20. The one or more non-transitory, machine-readable media of claim 15, the one or more processing devices further to perform:

causing the display device to present the content in accordance with the adjustment applied prior to receiving the selection of the user-selectable option;

wherein the causing the display device to present the content in accordance with the selection corresponds to retaining or not retaining the adjustment applied, depending on the selection.

* * * * *